Patented Nov. 5, 1940

2,220,252

UNITED STATES PATENT OFFICE 2,220,252

METHOD OF PREPARING PLANOGRAPHIC PLATES

Herbert L. Loeffler, Cleveland, Ohio, assignor to Addressograph-Multigraph Corporation, Cleveland, Ohio, a corporation of Delaware No Drawing. Application June 10, 1938, Serial No. 213,023

1 Claim. (Cl. 95—5.7)

In my invention I utilize a chromated colloid as sensitizer, the colloid being of such a nature that even after exposure to light, it is relatively easily soluble in water. This I accomplish by adding dextrine to gum arabic and other colloids heretofore standard for this purpose. At the same time, the light-exposed colloid becomes insoluble in a developing-etching medium which does attack the unexposed colloid, and, simultaneously, etches the metal under such unexposed portions. This combination of developing and etching actions is novel and eliminates steps hitherto necessary in deep etch operations. Following the developing-etching step, the plate need only be washed clear of excess developer-etch (as with anhydrous alcohol), inked in with any standard developing ink, asphaltum, lacquer, or similar water-repellent bases, and the whole plate then treated with running water. The water dissolves the light-reacted colloid, also called the "stencil," and the plate is now ready for the usual lithographic press procedure.

As an example of my process, I cite the following: A grained zinc plate is counteretched in the manner normal to lithography. It is then coated on a whirler using a sensitizing solution of the following formula:

| | Ounces |
|---|---|
| Water | 82 |
| Gum arabic | do 14 |
| Dextrine | do 7 |
| Albumin | do ½ |
| Ammonium dichromate | do 8 |
| Aqua ammonium | fl. ounce 1 |

After sensitizing, the zinc plate is exposed through a film positive and the action of an arc light, also in the standard manner. When exposure is complete, the plate is treated with my developer-etch, of the following formula:

| | Ounces |
|---|---|
| Water | 64 |
| Magnesium chloride | 64 |
| Calcium chloride | 32 |
| Ferric chloride | 1 |
| Lactic acid (85%) | 56 |

This solution is flowed on the plate, and the whole plate continuously swabbed with cotton or felt until the image shows clear metal all over, as also indicated by effervescence. This effervescence indicates deep etching of the metal, and the longer the contact of the developer-etch, the deeper will be the etching. There is no attack upon the light-hardened portion, or stencil, during this operation. The excess of developer-etch is now removed with alcohol, and the plate is permitted to dry. I then treat the plate with developing ink, and submerge it in running water, preferably lukewarm, and permit the stencil to soften. Light scrubbing with a bristle brush will remove all the stencil without at all affecting the image. After drying, the plate is ready for press preparation, as by gumming or similar treatment. This procedure will yield plates capable of press runs of 100,000 and over.

I claim:

That process of removing portions of a light-exposed chromate sensitized colloid film, containing an effective amount of dextrine, from a printing plate and deep etching the portions of the plate so exposed, which includes the step of treating the film-covered plate, after exposure, with a ferric chloride developer-etch containing magnesium and calcium chlorides, the magnesium chloride being in considerable excess over the calcium chloride, whereby the unexposed portions of the colloid film only are removed and the metal thus uncovered is etched, the presence of the dextrine in the film permitting the ready removal thereafter of the remainder of the film without affecting the etched plate.

HERBERT L. LOEFFLER.